United States Patent [19]
Murray

[11] 3,825,311
[45] July 23, 1974

[54] HIGH SPEED ROTATING MACHINES
[75] Inventor: Brian Desmond Allan Murray, Somerset, England
[73] Assignee: Normalair-Garrett (Holdings) Limited, Somerset, England
[22] Filed: Jan. 17, 1973
[21] Appl. No.: 324,515

[52] U.S. Cl. .............................................. 308/36.3
[51] Int. Cl. ............................................. F16c 33/74
[58] Field of Search .......... 308/36.3; 277/3, 59, 135

[56] References Cited
UNITED STATES PATENTS

| | | | |
|---|---|---|---|
| 2,239,283 | 4/1941 | Brown................................ | 308/36.3 |
| 2,682,991 | 7/1954 | Craig et al. ........................ | 308/36.3 |
| 2,858,975 | 11/1958 | Feilden ............................. | 308/36.3 |
| 3,164,420 | 1/1965 | Cramer, Jr. ....................... | 308/36.3 |
| 3,734,580 | 5/1973 | Discitelli .......................... | 308/36.3 |

Primary Examiner—Charles J. Myhre
Assistant Examiner—Barry Grossman
Attorney, Agent, or Firm—Larson, Taylor & Hinds

[57] ABSTRACT

Bearing seal means for high speed rotating machines which have a rotatable assembly supported by bearings and enclosed lubricating means therefor. The seal means provides ducts directing pressurised air towards the rotating shaft assembly outboard of both ends of the enclosure. The pressurised air bleeds from the ducts adjacent to the shaft assembly to pressurise a region between the seal means and the outboard faces of the enclosure to prevent oil seepage from the enclosure. Air bleed from the ducts is also permitted in an outboard direction and can provide cooling across the back of a compressor wheel.

7 Claims, 1 Drawing Figure

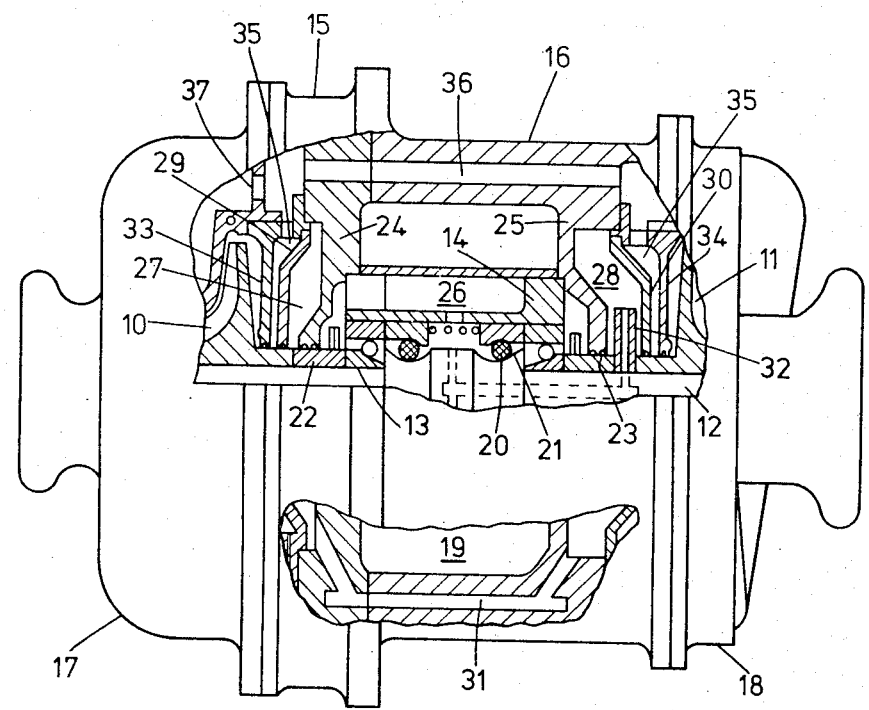

HIGH SPEED ROTATING MACHINES

This invention relates to high speed rotating macines, and is more particularly, but not exclusively, evolved for turbo-units.

It is an object of the invention to increase the period between servicing of high speed rotating machines by eliminating, or substantially eliminating, the loss of lubricant feeding the bearings which support a rotatable assembly of the machine. A further object is that, in obtaining the previous object, means may be derived which provide at least some cooling for one or more components of the rotatable assembly.

According to the invention we provide bearing seal means for high speed rotating machines which have a rotatable assembly supported by bearings and enclosed lubricating means therefor, comprising a lubrication chamber through which the rotatable assembly extends, being defined by wall members enclosing the bearings and the lubricating means, inner seal means in operable association between the wall members and a surface of the rotatable assembly, a duct arrangement directed towards the rotatable assembly, being disposed outboard of the wall members and forming a static pressure chamber therewith, outer seal means in operable association with the duct arrangement and surface of the rotatable assembly, entry being provided for pressurised fluid to pass into the duct, and a bleed path therefrom to both sides through the outer seal means.

The invention will now be described by way of example with reference to the accompanying drawing, which shows a sectional view of a turbo-unit as used in an air cycle cooling system.

The turbo-unit comprises a turbine 10 and a compressor 11 mounted on a common shaft 12 borne by two bearing races 13 within a bearing carrier 14. The bearing carrier 14 is supported within two main body portions 15, 16, which are the principal members of an arrangement forming an enclosed space. The space contains means which lubricate the bearing races 13. A combined turbine inlet and outlet fitting 17 is secured to the one main body portion 15, whilst a combined compressor inlet and outlet fitting 18 is secured to the other main body portion 16. The lubricating means comprises an annular lubricant reservoir 19 formed in part of the enclosed space and suitably packed with absorbent material through which a wick 20 is looped. The wick 20 is passed through the bearing carrier 14 and arranged to lie in contact with a pair of annular ramps 21 provided on the shaft 12 adjacent the inboard sides of the bearing races 13. At the outboard side of each bearing race 13, within the enclosed space, is an impeller 22 secured to the shaft 12. Closure of the space is made with the rotating shaft assembly by means of labyrinth seals 23 formed between the hub of each impeller 22 and a radial wall 24, 25, provided by the main body portions 15, 16, respectively. Circulating passages are provided from the region about the shaft ramps 21, through the bearing races 13 to the impellers 22, thence into an annular outer chamber 26 of the bearing carrier 14, returning to the region about the shaft ramps 21 at mid-position between them. Outboard of each labyrinth seal 23, now termed "inner seal," is provided a static pressure chamber 27, 28, contained between the radial walls 24, 25, and an inner element 29, 30, respectively, of outer seal means. The chambers 27, 28, are connected by a duct arrangement 31 provided by drillings in the main body portions 15, 16. In one chamber 28 a centrifugal pump 32 is secured to the shaft 12, being connected to the interior of the bearing carrier 14 in the region between the shaft ramps 21 by drillings in the shaft 12. The outer seal means further comprise an outer element 33, 34, spaced apart from the inner element 29, 30, respectively, so forming a discoid shaped duct 35 concentrically disposed about the shaft and through which air can be directed towards the shaft. The inner and outer elements 29, 30, 33, 34, are grooved in a manner to present a labyrinth which, in respect of elements 29, 33, co-operates as a seal with the hub of the turbine wheel and in respect of elements 30, 34, co-operates similarly with the hub of the compressor wheel. A duct arrangement 36 connects the two discoid ducts 35 with the inlet portion of the turbine inlet and outlet fitting 17, upstream of the turbine nozzles, at 37.

In operation of the turbo-unit, pressurised air is supplied to the turbine inlet and discharged through the turbine nozzles to expand across the turbine wheel which rotates and drives the compressor wheel to deliver compressed air. Lubrication of the bearing races 13 is provided by the wick 20 obtaining oil from the oil-charged absorbent material in the reservoir 19 and conveying it to the shaft ramps 21, where centrifuge effect causes the oil to be drawn from the wick 20 and thrown outwardly from the shaft as a mist. The impellers 22 positioned outboard of the bearing races 13 draw the mist therethrough and by way of the circulating passages, which include the annular outer chamber 26 of the bearing carrier 14, cause it to return to the region about the shaft between the ramps. Leakage of the lubricant is prevented by means of the inner seals 23, across which a pressure gradient is maintained, the higher pressure being on the outer sides in static pressure chambers 27 and 28. The higher pressure is obtained from the air supplied to the turbine inlet upstream of the turbine nozzles, at 37, and fed into the discoid ducts 35, by way of the duct arrangement 36. The higher pressure air is able to bleed from the discoid ducts 35 outwardly through the labyrinth seals of the inner and outer elements 29, 33; 30, 34, adjacent the hubs of the turbine and compressor wheels, into chambers 27, 28, respectively, on the one side, and into the region at the back of the respective wheels on the other side. Chambers 27, 28, obtain a static pressure as they have no outlet, whilst bleed to the back of the wheels is continuous. The bleed passes around the edge of the turbine wheel into a lower pressure region downstream of the turbine nozzles, and passes similarly around the edge of the compressor wheel into a lower pressure region upstream of the compressor diffuser vanes. In order that the pressure gradient shall remain compatible with system pressure changes, the centrifugal pump 32 tends to draw air from within the enclosed space towards the chamber 28 by way of the drillings in the shaft 12, but is limited in the reduction in pressure it creates, due to the static pressure existing in the chamber 28. The two chambers 27, 28, are maintained at the same pressure by way of their interconnecting duct arrangement 31. The air passing behind the compressor wheel provides some cooling effect upon it, the amount of air passing being determined by the annular gap between the labyrinth seal of the outer element 34 and the compressor wheel hub.

Several modifications and alterations may be made without departing from the scope of the invention, for example, the seal-pressurising air can be taken from another position in the high speed machine, or from an independent source being fed into the duct arrangement 36 and, if desired, having temperature control applied to it. Whilst a turbo machine has been described herein, it is to be understood that pressure seals according to this invention may be used in many forms of high speed machinery.

I claim as my invention:

1. In a high speed rotating machine having a rotatable assembly supported by bearings and enclosed lubricating means therefor, a seal assembly comprising:
   a lubrication chamber through which the rotatable assembly extends, said lubrication chamber being defined by wall members enclosing the bearings and the lubricating means;
   inner seal means in operable association between the wall members and a surface of the rotatable assembly;
   a duct arrangement directed towards the rotatable assembly, being disposed outboard of the wall members and forming a static pressure chamber therewith;
   outer seal means in operable association with the duct arrangement and a surface of the rotatable assembly;
   entry being provided for pressurized fluid to pass into the duct; a bleed path from the duct to both sides thereof through the outer seal means; and centrifugal pump means communicating the interior of said lubrication chamber with said static pressure chamber.

2. Apparatus as claimed in claim 1, wherein the duct arrangement comprises two spaced apart radial plates providing the duct between them.

3. Apparatus as claimed in claim 1 wherein said inner and outer seal means are labyrinth seals.

4. Apparatus as claimed in claim 1 wherein said machine is a turbo-compressor, and wherein said entry for pressurized fluid to pass into the duct is connected with a region of pressurized fluid in the turbine of the machine.

5. Apparatus as claimed in claim 4 wherein said bleed path, to one side of the duct, is arranged to bleed some of the fluid to the back of a compressor wheel of the machine.

6. Apparatus as claimed in claim 1 wherein said centrifugal pump is carried and driven by said rotatable assembly for tending to pump air from said lubrication chamber to said static pressure chamber.

7. In combination:
   a rotatable assembly,
   a housing disposed around said rotatable assembly and including bearing means to rotatably support said assembly,
   a lubrication chamber means disposed within said housing around said bearing means to provide lubrication to said bearing means, said lubrication chamber means including inner seal means disposed between said lubrication chamber means and said rotatable assembly, and
   static pressure chamber means disposed within said housing around said lubrication chamber means and including outer seal means disposed between said static pressure chamber means and said rotatable assembly, centrifugal pump means communicating the interior of said lubrication chamber with said static pressure chamber for tending to pump air from said lubrication chamber to said static pressure chamber.

* * * * *